March 17, 1970   B. DA VALLE   3,501,170
COMBINED HOLLOW BUMPER AND TRAILER HITCH FOR MOTOR VEHICLES
Filed Dec. 26, 1967

INVENTOR.
BRUNO DA VALLE
BY
ATTORNEYS

United States Patent Office 3,501,170
Patented Mar. 17, 1970

3,501,170
COMBINED HOLLOW BUMPER AND TRAILER
HITCH FOR MOTOR VEHICLES
Bruno Da Valle, 85 Tully Road,
San Jose, Calif. 95112
Filed Dec. 26, 1967, Ser. No. 693,357
Int. Cl. B60r 19/02
U.S. Cl. 280—500     1 Claim

ABSTRACT OF THE DISCLOSURE

A hollow rear bumper, the wall structure of which is made of two pieces of sheet metal shaped and welded to provide a strong rigid bumper structure which may be used for a trailer hitch as well as a bumper. The hollow bumper is provided with an opening on the top thereof through which tools, etc. may be placed into it for storage, and a suitable cover is attached to the top to close said opening.

---

This invention relates to a hollow bumper of rigid construction.

An object of this invention is to provide an improved hollow bumper of light weight and strong construction.

Another object of this invention is to provide an improved hollow bumper which is made of two pieces of sheet metal shaped and welded to provide a bumper of light weight and strong construction.

Another object of this invention is to provide an improved hollow bumper construction which is adapter to be attached to the rear frame parts of a motor vehicle by two horizontal members which extend into the hollow bumper and are welded thereto, said bumper also being provided with a trailer hitch permanently attached thereto in a recess formed in the back or rear wall of the bumper structure substantially in the central portion thereof.

Other and further objects of this invention will be apparent to those skilled in the art to which it relates from the following specification, claim and drawing in which, briefly:

Figure 1:
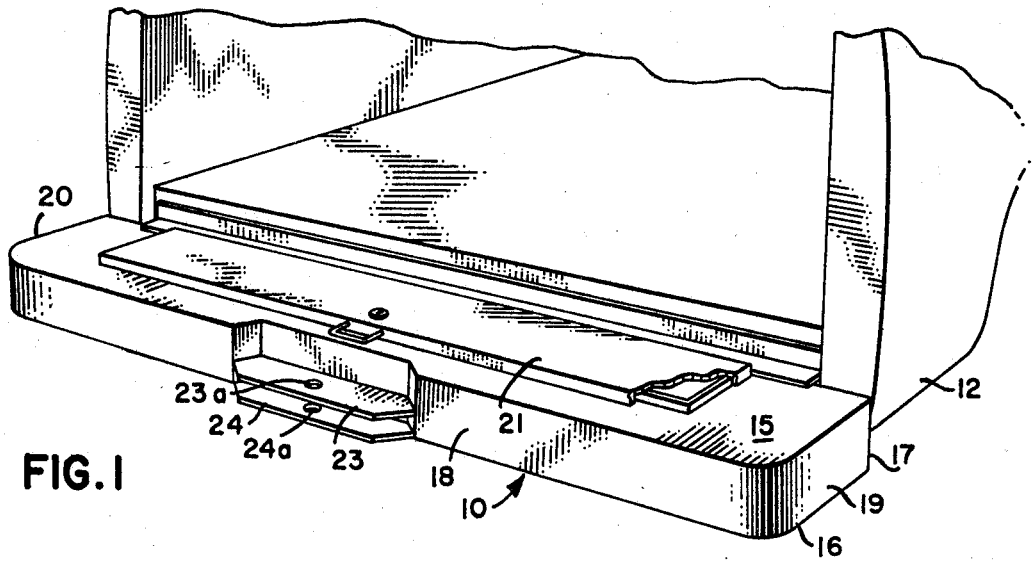
FIG. 1 is a perspective view of the bumper of this invention attached to the rear of a motor vehicle which is shown partially broken away.
Figure 2:
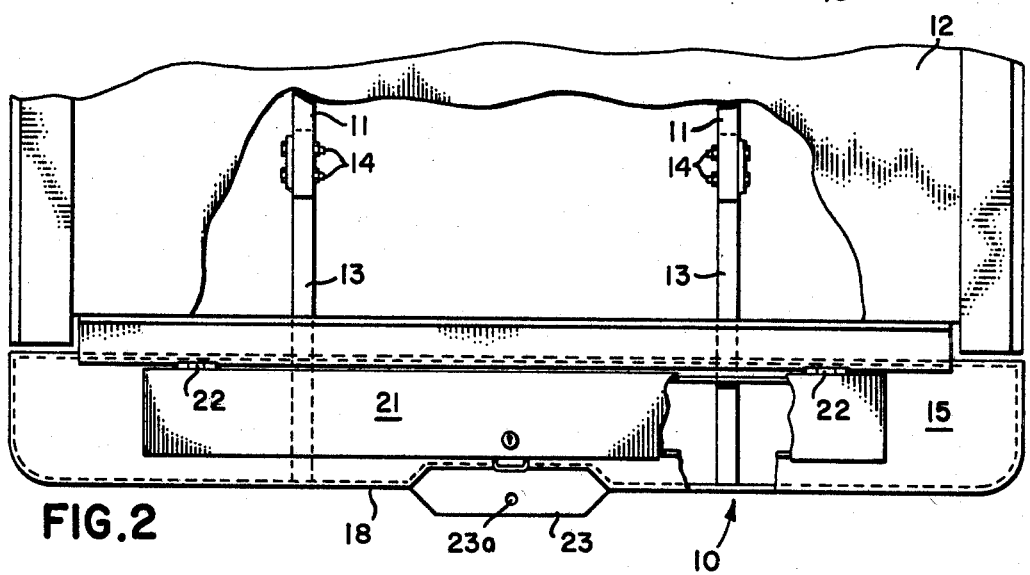
FIG. 2 is a top view of the bumper showing the members attaching the bumper to the motor vehicle frame, said bumper being partially broken away to show one of the members inside thereof.
Figure 3:
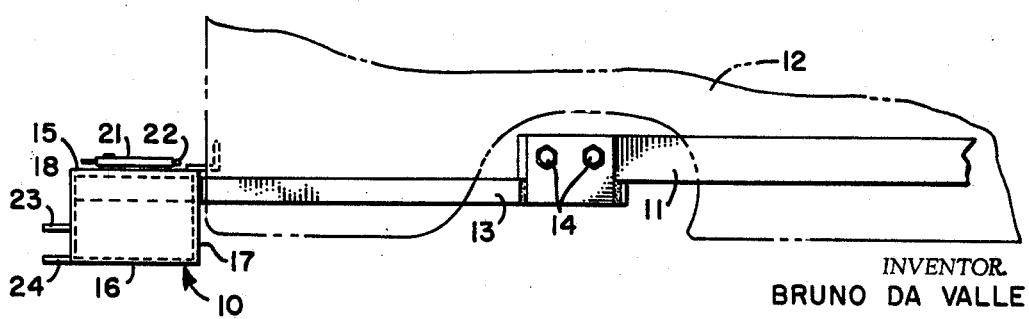
FIG. 3 is a side view of the bumper.

Referring to the drawing in detail, reference numeral 10 designates a hollow bumper structure that is attached to the frame members 11 at the rear end of the motor vehicle 12 by a pair of horizontally disposed spaced members 14 which are attached to the frame members 11 by the bolts 14, as shown in FIGS. 2 and 3.

The hollow bumper 10 is provided with top, bottom and front wall structure designated by reference numerals 15, 16 and 17, respectively, which may be formed from a single sheet of metal by bending it to the desired shape, as illustrated. The back and sides designated by reference numerals 18, 19 and 20, respectively, of the hollow bumper are shaped from a single sheet of metal of elongated configuration. The edges of the elongated sheet bent to form the back 18 and sides 19 and 20 are welded to the edges of the top 15 and bottom 16. The ends of the sides 19 and 20 are welded to the ends of the back 17. This construction provides a hollow bumper member that is light-weight and strong.

The top 15 is provided with a long narrow hole that is adapted to be closed by the cover 21 which is attached to the forward part of the top 15 by the hinges 22. The cover 21 is provided with a flange around the periphery thereof extending downward and enclosing an upwardly projecting flange that is formed around the hole in the top member 15. Thus, the cover 21 seals the opening in the top to prevent rain from being driven into the inside of the hollow bumper, and at the same time easy, access may be gained to the inside of the bumper for storage of tools and the like therein.

The horizontal supporting members 13 extend into the inside of the hollow bumper through suitable holes provided in the front wall 17 thereof. The supporting members 13 are attached to the top 15, front 17 and back 18 of the hollow bumper by welding or the like to provide a strong construction which may be employed for the purpose of hitching a trailer or similar vehicle which is to be drawn by the motor vehicle 12. For this purpose the rear wall 18 of the bumper is provided with a recess for receiving the trailer hitch plates 23 and 24 which are welded thereto. Plates 23 and 24 are provided with holes 23a and 24, respectively, for use in hitching a trailer (not shown) thereto. The back sides and slanted edges of the plates 23 and 24 are attached to surfaces of the recess in the central part of the back bumper wall 18 between the horizontal supporting members 13 so that the trailer hitched to these plates is pulled from the center of the bumper and between the supports 13.

While I have shown a preferred embodient of the invention, it will be understood that the invention is capable of variation and modification from the form shown so that the scope thereof should be limited only by the proper scope of the claim appended hereto.

I claim:

1. In a combined bumper and trailer hitch for motor vehicles, the combination of a hollow bumper having top, bottom, front, rear and end wall structure, said top, bottom and front wall structure of the bumper comprising a one-piece sheet metal member bent to provide the top, bottom and front of said wall structure, said rear and end wall structure being formed of an elongated sheet metal member having a width substantially equal to the distance between said top and said bottom, means attaching the top and bottom edges of said elongated member to said top and to said bottom respectively, and means attaching the end edges of said elongated member to the end edges of said front whereby said wall structure forms a rigid hollow bumper which is also adapted for use as a chest for transporting and storing various tools, said top of said hollow bumper being provided with an elongated opening extending over a substantial part of said top through which articles may be placed thereinto for storage, a cover for said elongated opening, hinge means attaching said cover to said top, a pair of spaced members, means permanently attaching said spaced members to the inside of the rear wall of said hollow bumper, means attaching said pair of spaced members to the rear part of the frame of the motor vehicle, means adapted for use as a trailer hitch, and means permanently attaching said last mentioned means to said rear wall structure between said pair of spaced members substantially evenly spaced therefrom.

References Cited

UNITED STATES PATENTS

| | | | | |
|---|---|---|---|---|
| 1,609,274 | 11/1926 | McFadden. | | |
| 2,492,914 | 12/1949 | Barden | 293—69 | X |
| 2,603,527 | 7/1952 | Perkins | 293—69 | X |
| 2,893,779 | 7/1959 | Bayley | 293—69 | X |
| 2,993,721 | 7/1961 | Bowman | 293—69 | |
| 3,318,617 | 5/1967 | Burns | 280—500 | |

LEO FRIAGLIA, Primary Examiner

U.S. Cl. X.R.

293—69